(12) United States Patent
Klein et al.

(10) Patent No.: US 6,670,573 B2
(45) Date of Patent: Dec. 30, 2003

(54) METHOD OF JOINING TWO MEMBERS OF A VEHICLE SEAT

(75) Inventors: Ralf Klein, Rockenhausen (DE); Johannes Kraus, Landstuhl (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 112 days.

(21) Appl. No.: 09/934,266

(22) Filed: Aug. 21, 2001

(65) Prior Publication Data
US 2002/0043521 A1 Apr. 18, 2002

Related U.S. Application Data

(63) Continuation of application No. PCT/EP00/10691, filed on Oct. 31, 2000.

(30) Foreign Application Priority Data

Dec. 21, 1999 (DE) .......................................... 199 61 696

(51) Int. Cl.⁷ ............................................. B23K 26/20
(52) U.S. Cl. ................................................. 219/121.64
(58) Field of Search ....................... 219/121.63, 121.64, 219/121.82, 121.85; 228/135, 136, 138

(56) References Cited

U.S. PATENT DOCUMENTS

| | | | |
|---|---|---|---|
| 5,168,841 A | | 12/1992 | Suzuki et al. |
| 5,503,256 A | * | 4/1996 | Redgrave et al. |
| 5,573,345 A | | 11/1996 | Voss et al. |
| 5,681,086 A | | 10/1997 | Baloche |
| 5,878,940 A | * | 3/1999 | Rosenbalm |
| 6,010,191 A | | 1/2000 | Calinaud et al. |
| 6,052,901 A | | 4/2000 | Stegemann et al. |

FOREIGN PATENT DOCUMENTS

| | | |
|---|---|---|
| DE | 274559 | 12/1912 |
| DE | 195 33 831 C1 | 1/1997 |
| DE | 198 13 517 A1 | 10/1998 |

OTHER PUBLICATIONS

Opposition Brief filed in German Patent and Trademark Office on Jul. 17, 2001 against DE 199 61 969, priority of U.S. Ser. No. 09/934,266.

Taschenbuch Feingeratetechnik, H. Fischer et al, 1971.

\* cited by examiner

*Primary Examiner*—Samuel M. Heinrich
(74) *Attorney, Agent, or Firm*—Alston & Bird LLP

(57) ABSTRACT

In a method of joining two members (1,8) of a vehicle seat, of which a first member (1) includes at least one projection, and a second member (8) at least one receptacle, wherein the two members (1,8) are joined by inserting the projection into the receptacle and subsequently welded, welding occurs on the side of the second member (8) facing away from the first member (1) inside the receptacle, which is designed and constructed as a through bore.

12 Claims, 1 Drawing Sheet

METHOD OF JOINING TWO MEMBERS OF A VEHICLE SEAT

CROSS-REFERENCE TO RELATED APPLICATION

This is a continuation of International Application No. PCT/EP00/10691, filed Oct. 31, 2000 and designating the U.S.

BACKGROUND OF THE INVENTION

The present invention relates to a method of joining two members of a vehicle seat, with a first of the members having a projection and the second of the members having a receptacle, and the two members being joined by inserting the projection into the receptacle and then welding.

For a known method of the above-described kind, for example, the upper member of a hinge fitting includes two projecting facets in the form of triangular, truncated pyramids, which are inserted into receptacles of an adaptation member of the seat back structure. The upper member and the adaptation member are then joined by electric welding. A disadvantage of this known method is that weld spatters may form, which adversely affects the function of the hinge fitting, so that it must be eliminated as a reject.

SUMMARY OF THE INVENTION

In accordance with one aspect, the present invention solves the above and other problems by the provision of improvements to the above-described method, by way of which damage to sensitive parts of a vehicle seat is avoided. In accordance with this aspect, a method of joining two members of a vehicle seat includes providing a first member with at least one projection, providing a second member with at least one bore that extends through the second member, and then joining the members. The members are joined by inserting the projection into the bore, and then welding the first and second members together by forming a weld inside the bore while the projection is within the bore. The welding is effected from a side of the second member facing away from the first member. More specifically, the welding is preferably effected by introducing a welding medium, such as a laser beam, into the bore from the side of the second member facing away from the first member.

As a result of performing the welding on the side of the second member facing away from the first member, and forming the weld inside a receptacle, which is designed and constructed as the above-mentioned through bore, the risk of weld spatters on the outer side of the parts is lessened, in particular where sensitive components are located. For purposes of substantially avoiding weld spatters, welding occurs preferably within the receptacle, in a location set back from the side facing away from the first member. By inserting a projection into the receptacle, a preliminary positioning occurs, which does not require additional auxiliary means. In addition, forces can be adequately transmitted without requiring that the weld seam include large quantities of material.

To provide a reliable cohesion, it is preferred for the weld seam to be positioned inside the receptacle and surround the projection. To obtain an accurately positioned weld seam, it is of advantage to form a channel in which the weld seam is formed inside the receptacle. For example, the channel can be formed by means of bevels, radii, or the like on the projection and/or on the receptacle on the side facing away from the first member and set back from the latter.

Preferably, the two members are joined by means of laser welding. This kind of welding exhibits especially little distortion. However, other kinds of welding are also possible. It is possible to accomplish an initial centering, and with that likewise an accurate positioning of the weld seam, in that the projection and the receptacle are provided with the same, for example, circular cross section and little play, and no play if possible. Likewise possible are other cross sections, for example, triangular.

BRIEF DESCRIPTION OF THE DRAWINGS

Figure 1:
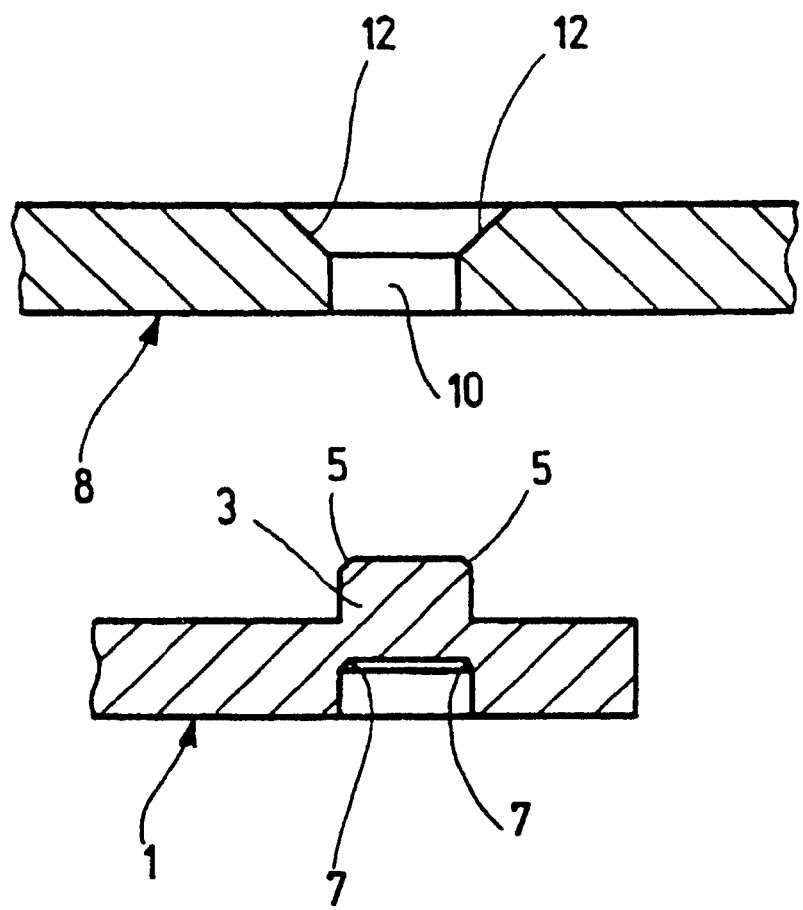
Figure 2:
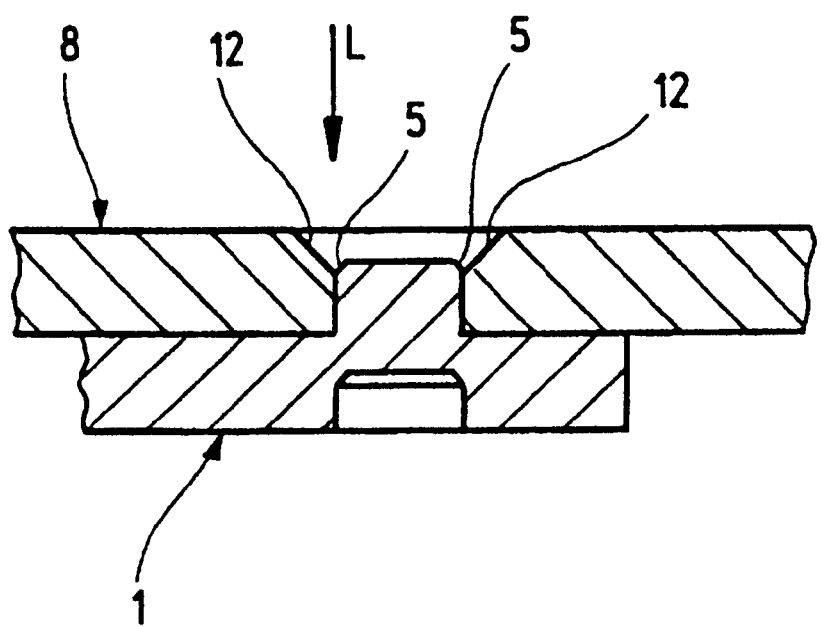

Having thus described the invention in general terms, the invention will now be described in greater detail with reference to a method that is described by way of example with reference to the drawings, in which:

FIG. 1 is a sectional view of two members of a vehicle seat, which are to be combined, before their joining; and FIG. 2 is a sectional view corresponding to FIG. 1 during the welding.

DETAILED DESCRIPTION OF THE INVENTION

In the manufacture of a hinge fitting, two round stubs 3 are pushed out from a fitting member 1, which is the upper member in the present embodiment, by deforming the, for example, 4 mm thick material. The side of fitting member 1, from which the round stubs 3 extend, is hereafter named the outer side.

The two round stubs 3 have approximately the shape of a circular-cylindrical pin with a diameter of just slightly less than 10 mm. The height of round stubs 3 above the outer side of fitting member 1 amounts to about 2.5 mm. On their outward facing end side, the round stubs 3 include a first bevel 5 with an angle of 45° and a height of about 0.5 mm. Relative to the inner side of fitting member 1, the round stubs 3 are correspondingly recessed and include on their end side a second bevel 7, which is formed with the same dimensions parallel offset from the first bevel 5.

A 4 mm thick, flat adaptation member 8, which is adapted to the special dimensions of the seat component structure or, in the present embodiment, to the seat back structure, includes a circular through bore 10 of a full 10 mm. On the outer side of adaptation member 8, a third bevel 12 is provided surrounding through bore 10 with a depth of about 1.25 mm and an angle of 45°. This third bevel widens through bore 10 toward the outer side in the shape of a funnel to a diameter of about 12.5 mm.

To join fitting member 1 and adaptation member 8, these two members are combined, and for an initial centering, the round stubs 3 are inserted into the through bores 10 acting as receptacles, with the direction of insertion pointing outward. In their tolerances, the diameters of round stubs 3 and through bores 10 are selected such that the round stubs 3 can be inserted into through bores 10 not only without play, but also without resistance.

Once the round stubs 3 are completely inserted into through bores 10, namely, when the outer side of fitting member 1 lies against the inner side of adaptation member 8, the first bevel 5 and the third bevel 12 form, in the case of each round stub 3, a peripheral channel about same, which is set back from the outer side of adaptation member 8 in a plane crosswise to the direction of insertion (FIG. 2). In the direction of arrow L, namely opposite to the direction of insertion and from the outer side of adaptation member 8, a laser beam is directed to this channel from a laser welding device (not shown), and a weld seam is produced inside thereof, which extends about stub 3, thereby joining fitting member 1 and adaptation member 8.

What is claimed is:

1. A method of joining two members of a vehicle seat, comprising:

providing first and second members, including providing the first member with at least one projection, and providing the second member with at least one bore that extends through the second member; and joining the first and second members to one another, including:
  inserting the projection into the bore, and
  then welding the first and second members together by forming a weld seam that extends about the projection and inside the bore while the projection is in the bore, wherein the welding is effected from a side of the second member facing away from the first member, and wherein the welding includes welding inside the bore in a location distant from the side of the second member facing away from the first member.

2. A method according to claim 1, wherein the providing is carried out so that at least one of the projection and the bore includes a bevel facing away from the first member.

3. A method according to claim 2, wherein:

the providing is carried out so that the projection includes the bevel, and the bore also includes a bevel facing away from the first member;

the inserting includes arranging the projection and the bore so that a channel is formed by cooperation between the bevel of the projection and the bevel of the bore; and the welding includes forming the weld seam inside the channel.

4. A method according to claim 1, wherein the welding is performed with a laser.

5. A method according to claim 1, wherein the providing includes:

providing the projection so that the projection is in the form of round stub with a circular cross section; and providing the bore so that the bore has a circular cross section.

6. A method according to claim 1, wherein the providing includes:

providing the projection so that the projection has a triangular cross section; and providing the bore so that the bore has a triangular cross section.

7. A method according to claim 1, wherein:

the inserting includes moving the projection in a first direction while the projection is within the bore; and wherein the providing includes sizing the projection and the bore so that there is substantially no play between the projection and the bore in a direction that is generally perpendicular to the first direction while the projection is within the bore.

8. A method according to claim 1, wherein the welding is performed with a laser so that a laser beam enters an open end of the bore, with the open end being defined by the side of the second member facing away from the first member.

9. A method of joining two members of a vehicle seat, comprising:

providing first and second members, including providing the first member with at least one projection, and providing the second member with at least one bore that extends through the second member, wherein the providing is carried out so that the projection and bore each include a bevel facing away from the first member; and joining the first and second members to one other, including:
  inserting the projection into the bore, wherein the inserting includes arranging the projection and the bore so that a channel is formed by cooperation between the bevel of the projection and the bevel of the bore, and
  then welding the first and second members together by forming a weld seam inside the channel and the bore while the projection is in the bore, so that the weld seam extends about the projection and inside the bore, wherein the welding includes introducing a welding medium into the bore from a side of the second member facing away from the first member.

10. A method according to claim 9, wherein the introducing the welding medium includes introducing a laser beam into an open end of the bore, with the open end being defined by the side of the second member facing away from the first member.

11. A method according to claim 9, wherein the welding includes welding inside the bore in a location distant from the side of the second member facing away from the first member.

12. A method according to claim 9, wherein:

the inserting includes moving the projection in a first direction while the projection is within the bore; and the providing includes sizing the projection and the bore so that there is substantially no play between the projection and the bore in a direction that is generally perpendicular to the first direction while the projection is within the bore.

* * * * *